UNITED STATES PATENT OFFICE 2,422,617

VITAMIN B6 INTERMEDIATES

Stanton A. Harris, Westfield, N. J., assignor to Merck & Co., Inc., Rahway, N. J., a corporation of New Jersey No Drawing. Application July 11, 1944, Serial No. 544,471

18 Claims. (Cl. 260—297)

This application relates generally to a process for the preparation of novel chemical compounds; in a particular sense it is concerned with the preparation of intermediates useful in the synthesis of vitamin B6 (2-methyl-3-hydroxy-4,5-dihydroxymethylpyridine).

This application is a continuation-in-part of the copending application by the same inventor, Serial No. 267,603, filed April 13, 1939, entitled "Synthesis of vitamin B6 intermediates and process for producing them."

The compounds forming the subject matter of the present invention are represented by the formula:

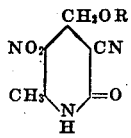

wherein R is an alkyl, aryl or aralkyl group. According to the present invention, these compounds are obtained by nitrating a compound of the formula:

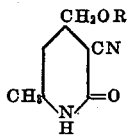

wherein R is as above. It is presently preferred to conduct this reaction in a solvent such as acetic anhydride or an equivalent organic liquid wherein the reactants and the reaction product are soluble and which is substantially inert with respect to the nitrating agent used under the conditions of reaction. It is preferred to perform the reaction at temperatures less than about 100° C.

It will be understood by those versed in this art that pyridones are equivalents of the corresponding hydroxy pyridine, for example:

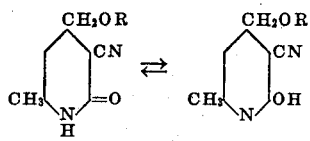

The following examples illustrate methods of carrying out the present invention, but it is to be understood that these examples are given by way of illustration and not of limitation.

Example 1

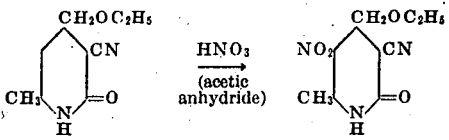

About 5 g. of 3-cyano-4-ethoxymethyl-6-methyl-2-pyridone (obtained by reacting ethoxyacetylacetone and cyano-acetamide) in 13 cc. of acetic anhydride is cooled and treated with 2.16 cc. of fuming nitric acid in 2 cc. of acetic anhydride, a little urea being added as a catalyst. The solid gradually dissolves with evolution of heat. The reaction mixture is maintained at a temperature below about 45° C. until the reaction is completed, as indicated by cessation of heat evolution. Upon pouring the mixture onto ice, crystallization of 3-cyano-4-ethoxymethyl-5-nitro-6-methyl-2-pyridone (M. P. 164–165° C.) takes place. The product is removed and purified by conventional operations.

Example 2

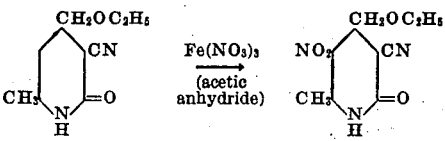

To about 40 g. of 3-cyano-4-ethoxymethyl-6-methyl-2-pyridone is added sufficient acetic anhydride to form a paste, and the mixture heated to about 70° C. To this mixture is added, with agitation, a solution of 60 g. of ferric nitrate $(Fe(NO_3)_3 \cdot 9H_2O)$ in 250 cc. of acetic anhydride, maintaining the temperature at about 70–80° C. Upon pouring the mixture onto ice, precipitation of 3-cyano-4-ethoxymethyl-5-nitro-6-methyl-2-pyridone (M. P. 164–165° C.) occurs. The product is removed and purified by conventional operations.

In like manner 3-cyano-4-benzyloxymethyl-6-methyl-2-pyridone is nitrated to yield 3-cyano-4-benzyloxymethyl-5-nitro-6-methyl-2-pyridone; and 3-cyano-4-phenoxymethyl-6-methyl-2-pyridone is nitrated to yield 3-cyano-4-phenoxymethyl-5-nitro-6-methyl-2-pyridone.

Modifications may be made in carrying out the present invention without departing from the spirit and scope thereof, and the invention is to be limited only by the appended claims.

What is claimed is:

1. A compound represented by the formula:

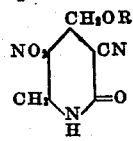

wherein R is selected from the group consisting of alkyl, aryl and aralkyl.

2. A compound represented by the formula:

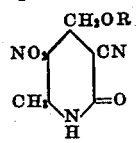

wherein R is alkyl.

3. A compound represented by the formula:

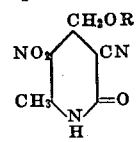

wherein R is aryl.

4. A compound represented by the formula:

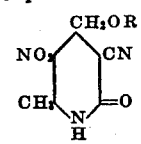

wherein R is aralkyl.

5. A compound represented by the formula:

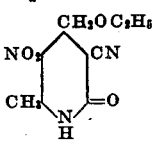

6. The process which comprises reacting a compound of the formula:

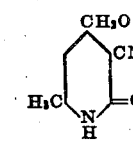

wherein R is selected from the class consisting of alkyl, aryl and aralkyl groups with a nitrating agent in the presence of acetic anhydride to form a compound of the formula:

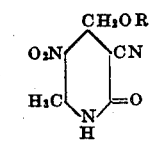

wherein R is as above.

7. The process which comprises reacting 3-cyano-4-alkoxymethyl-6-methyl-2-pyridone with a nitrating agent in the presence of acetic anhydride to form 3-cyano-4-alkoxymethyl-5-nitro-6-methyl-2-pyridone.

8. The process which comprises reacting 3-cyano-4-aryloxymethyl-6-methyl-2-pyridone with a nitrating agent in the presence of acetic anhydride to form 3-cyano-4-aryloxymethyl-5-nitro-6-methyl-2-pyridone.

9. The process which comprises reacting 3-cyano-4-aralkoxymethyl-6-methyl-2-pyridone with a nitrating agent in the presence of acetic anhydride to form 3-cyano-4-aralkoxymethyl-5-nitro-6-methyl-2-pyridone.

10. The process which comprises reacting 3-cyano-4-ethoxymethyl-6-methyl-2-pyridone with a nitrating agent in the presence of acetic anhydride to form 3-cyano-4-ethoxymethyl-5-nitro-6-methyl-2-pyridone.

11. The process which comprises reacting a compound of the formula:

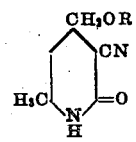

wherein R is selected from the class consisting of alkyl, aryl and aralkyl groups with fuming nitric acid in the presence of acetic anhydride to form a compound of the formula:

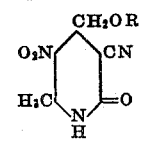

wherein R is as above.

12. The process which comprises reacting 3-cyano-4-ethoxymethyl-6-methyl-2-pyridone with fuming nitric acid in the presence of acetic anhydride to form 3-cyano-4-ethoxymethyl-5-nitro-6-methyl-2-pyridone.

13. The process which comprises reacting a compound of the formula:

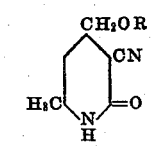

wherein R is selected from the class consisting of alkyl, aryl, and aralkyl groups with ferric nitrate in the presence of acetic anhydride to form a compound of the formula:

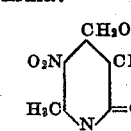

wherein R is as above.

14. The process which comprises reacting 3-cyano-4-ethoxymethyl-6-methyl-2-pyridone with ferric nitrate in the presence of acetic anhydride to form 3-cyano-4-ethoxymethyl-5-nitro-6-methyl-2-pyridone.

15. The process which comprises reacting 3-cyano-4-alkoxymethyl-6-methyl-2-pyridone with fuming nitric acid in the presence of acetic anhydride to form 3-cyano-4-alkoxymethyl-5-nitro-6-methyl-2-pyridone.

16. The process which comprises reacting 3-cyano-4-aralkoxymethyl-6-methyl-2-pyridone with fuming nitric acid in the presence of acetic anhydride to form 3-cyano-4-aralkoxymethyl-5-nitro-6-methyl-2-pyridone.

17. The process which comprises reacting 3-cyano-4-aralkoxymethyl-6-methyl-2-pyridone with ferric nitrate in the presence of acetic anhydride to form 3-cyano-4-aralkoxymethyl-5-nitro-6-methyl-2-pyridone.

18. The process which comprises reacting 3-cyano-4-alkoxymethyl-6-methyl-2-pyridone with ferric nitrate in the presence of acetic anhydride to form 3-cyano-4-alkoxymethyl-5-nitro-6-methyl-2-pyridone.

STANTON A. HARRIS.